United States Patent
Fu (10) Patent No.: US 11,843,652 B2
(45) Date of Patent: Dec. 12, 2023

(54) DATA PROCESSING METHOD AND ELECTRONIC DEVICE

(71) Applicant: VIVO MOBILE COMMUNICATION CO., LTD., Dongguan (CN)

(72) Inventor: Leilei Fu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/839,458

(22) Filed: Jun. 13, 2022

(65) Prior Publication Data
US 2022/0311818 A1    Sep. 29, 2022

Related U.S. Application Data

(63) Continuation of application No. PCT/CN2020/135206, filed on Dec. 10, 2020.

(30) Foreign Application Priority Data

Dec. 16, 2019   (CN) .......................... 201911295261.X (51) Int. Cl.
*H04L 65/80* (2022.01)
*H04L 65/75* (2022.01)
*H04L 43/0829* (2022.01)

(52) U.S. Cl.
CPC .......... *H04L 65/80* (2013.01); *H04L 43/0829* (2013.01); *H04L 65/765* (2022.05)

(58) Field of Classification Search
CPC .... H04L 65/80; H04L 65/765; H04L 43/0829
See application file for complete search history.

(56) References Cited

U.S. PATENT DOCUMENTS

| | | | |
|---|---|---|---|
| 9,185,045 B1 | 11/2015 | Yang et al. | |
| 10,291,541 B1 | 5/2019 | Sung et al. | |
| 2008/0117819 A1* | 5/2008 | Flott | H04L 47/11 370/232 |

(Continued)

FOREIGN PATENT DOCUMENTS

| | | |
|---|---|---|
| CN | 103814582 A | 5/2014 |
| CN | 104702968 A | 6/2015 |

(Continued)

OTHER PUBLICATIONS

Extended European Search Report issued in related European Application No. 20904140.9, dated Oct. 25, 2022, 9 pages.

(Continued)

*Primary Examiner* — Jonathan A Bui
(74) *Attorney, Agent, or Firm* — IPX PLLC (57) ABSTRACT

A data processing method and an electronic device are provided. The method includes: obtaining, in a case that a first electronic device makes a video call, a packet loss amount of multimedia data packets of the video call within a predetermined period of time; and clearing a target multimedia data packet if the packet loss amount is greater than or equal to a predetermined threshold, and sending multimedia data packets currently generated by the video call to a server. The target multimedia data packet is: all multimedia data packets corresponding to the video call cached in the first electronic device.

18 Claims, 2 Drawing Sheets

The first electronic device obtains, in a case that a first electronic device makes a video call, a packet loss amount of multimedia data packets of the video call within a predetermined period of time ~201

The first electronic device clears a target multimedia data packet if the packet loss amount is greater than or equal to a predetermined threshold, and sends multimedia data packets currently generated by the video call to a server ~202

(56) References Cited

U.S. PATENT DOCUMENTS

| | | | | |
|---|---|---|---|---|
| 2010/0034187 | A1* | 2/2010 | Kumar | H04W 28/0284 |
| | | | | 370/345 |
| 2015/0333991 | A1* | 11/2015 | Liu | H04L 47/762 |
| | | | | 455/406 |
| 2020/0344644 | A1* | 10/2020 | Liu | H04L 69/04 |
| 2021/0127305 | A1* | 4/2021 | Xu | H04L 43/0829 |

FOREIGN PATENT DOCUMENTS

| | | |
|---|---|---|
| CN | 108769450 A | 11/2018 |
| CN | 108924574 A | 11/2018 |
| CN | 110290559 A | 9/2019 |
| CN | 111131210 A | 5/2020 |

OTHER PUBLICATIONS

Examination Report issued in related Indian Application No. 202227038793, dated Oct. 20, 2022, 5 pages.
International Search Report issued in corresponding International Application No. PCT/CN2020/135206, dated Mar. 10, 2021, 5 pages.
First Office Action issued in related Chinese Application No. 201911295261.X, dated Feb. 2, 2021, 7 pages.
Second Office Action issued in related Chinese Application No. 201911295261.X, dated Jun. 10, 2021, 5 pages.

\* cited by examiner

FIG. 1

The first electronic device obtains, in a case that a first electronic device makes a video call, a packet loss amount of multimedia data packets of the video call within a predetermined period of time ~201

The first electronic device clears a target multimedia data packet if the packet loss amount is greater than or equal to a predetermined threshold, and sends multimedia data packets currently generated by the video call to a server ~202

DATA PROCESSING METHOD AND ELECTRONIC DEVICE

CROSS-REFERENCE TO RELATED APPLICATIONS

This application is a continuation of International Application No. PCT/CN2020/135206, filed Dec. 10, 2020, which claims priority to Chinese Patent Application No. 201911295261.X, filed Dec. 16, 2019. The entire contents of each of the above-referenced applications are expressly incorporated herein by reference.

TECHNICAL FIELD

Embodiments of the present disclosure relate to the field of communication technologies, and in particular, to a data processing method and an electronic device.

BACKGROUND

With the development of electronic technologies, electronic devices play an increasingly important role in the daily life of users. In various scenarios, a user applies a video call function of an electronic device, so that the user can make a video call with other users through the electronic device.

In the conventional technology, after enabling the video call function, and when sending a multimedia data packet of the video call to a back-end server, the electronic device detects whether the multimedia data packet has been transmitted to the back-end server within a predetermined time.

However, the electronic device will continue to send a large quantity of multimedia data packets to the back-end server during a video call process. Therefore, to ensure the normal transmission of subsequent data, if the electronic device detects that any multimedia data packet has not been transmitted within the predetermined time, the electronic device discards the multimedia data packet to avoid excessive delay and queuing of data of the electronic device.

In this way, it is very likely that a peer electronic device cannot parse the multimedia data packet, thereby causing the peer electronic device to continuously generate screen blurring.

SUMMARY

Embodiments of the present disclosure provide a data processing method and an electronic device.

According to a first aspect, an embodiment of the present disclosure provides a data processing method, including:

obtaining, in a case that a first electronic device makes a video call, a packet loss amount of multimedia data packets of the video call within a predetermined period of time; and clearing a target multimedia data packet if the packet loss amount is greater than or equal to a predetermined threshold, and sending multimedia data packets currently generated by the video call to a server.

The target multimedia data packet is: all multimedia data packets corresponding to the video call cached in the first electronic device.

According to a second aspect, an embodiment of the present disclosure further provides an electronic device, including:

an obtaining module, configured to obtain, in a case that a first electronic device makes a video call, a packet loss amount of multimedia data packets of the video call within a predetermined period of time; and an execution module, configured to clear a target multimedia data packet if the packet loss amount obtained by the obtaining module is greater than or equal to a predetermined threshold, and send multimedia data packets currently generated by the video call to a server.

The target multimedia data packet is: all multimedia data packets corresponding to the video call cached in the first electronic device.

According to a third aspect, an embodiment of the present disclosure provides an electronic device, including a processor, a memory, and a computer program stored in the memory and runnable on the processor, the computer program, when executed by the processor, implementing the steps of the data processing method according to the first aspect.

According to a fourth aspect, an embodiment of the present disclosure provides a computer-readable storage medium, storing a computer program, the computer program, when executed by a processor, implementing the steps of the data processing method according to the first aspect.

DETAILED DESCRIPTION

The following clearly describes the technical solutions in embodiments of the present disclosure with reference to the accompanying drawings in the embodiments of the present disclosure. Apparently, the described embodiments are some of the embodiments rather than all of the embodiments of the present disclosure. All other embodiments obtained by a person of ordinary skill in the art based on the embodiments of the present disclosure without creative efforts shall fall within the protection scope of the embodiments of the present disclosure.

It should be noted that, "I" in this specification means "or". For example, A/B may mean A or B. "And/or" in this specification describes only an association relationship for describing associated objects and represents that three relationships may exist. For example, A and/or B may represent the following three cases: Only A exists, both A and B exist, and only B exists.

It should be noted that, "a plurality of" in this specification refers to two or more than two.

It should be noted that, in the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. Exactly, the use of the word "exemplary" or "for example" or the like is intended to present a related concept in a specific manner.

It should be noted that, for ease of describing the technical solutions in the embodiments of the present disclosure clearly, in the embodiments of the present disclosure, words such as "first" and "second" are used to distinguish same or similar items with a basically same function or role. A person of ordinary skill in the art can understand that the words such as "first" and "second" do not define the amount and the operating sequence. For example, a first electronic device and a second electronic device are used to distinguish different electronic devices, not to describe a specific order of electronic devices.

The I-frame is alternatively referred to as an intra-coded frame, which is an independent frame with all information and may be decoded without referring to other images. The I-frame may be simply understood as a static image. The first frame in a video sequence is always the I-frame, because it is a key frame.

The P-frame is alternatively referred to as an inter-frame predictive-coded frame, which may need to be encoded with reference to the previous I-frame. The P-frame indicates a difference between images of the current frame and the previous frame (the previous frame may be the I-frame or the P-frame). In a case of decoding, a difference defined by the current frame needs to be superimposed onto a previously buffered image to generate a final image. Compared with the I-frame, the P-frame usually occupies fewer data bits, but the disadvantage is that the P-frame is very sensitive to transmission errors because of the complex dependence on the previous P-frame and I-frame.

A data processing method according to the embodiments of the present disclosure may be performed by the foregoing electronic device (including a mobile electronic device and a non-mobile electronic device), or a functional module and/or functional entity in the electronic device capable of implementing the data processing method, which may be specifically determined according to actual use requirements, and is not limited in the embodiments of the present disclosure. An electronic device is used as an example below to illustrate the data processing method provided in the embodiments of the present disclosure.

The electronic device in the embodiments of the present disclosure may be a mobile electronic device or a non-mobile electronic device. The mobile electronic device may be a mobile phone, a tablet computer, a notebook computer, a palmtop computer, an in-vehicle terminal device, a wearable device, an ultra-mobile personal computer (UMPC), a netbook, a personal digital assistant (PDA), or the like; and the non-mobile electronic device may be a personal computer (PC), a television (TV), a teller machine, a self-service machine, or the like, which are not specifically limited in the embodiments of the present disclosure.

The electronic device in the embodiments of the present disclosure may be an electronic device with an operating system. The operating system may be an Android operating system, an IOS operating system, or another possible operating system, which is not specifically limited in the embodiments of the present disclosure.

The Android operating system is used as an example below to describe a software environment to which the data processing method according to the embodiments of the present disclosure is applicable.

Figure 1:
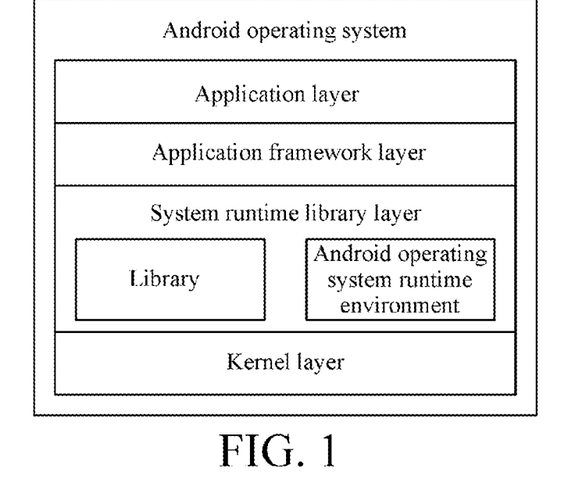
FIG. 1 is a schematic diagram of an architecture of a possible Android operating system according to an embodiment of the present disclosure.

FIG. 1 is a schematic diagram of an architecture of a possible Android operating system according to an embodiment of the present disclosure. In FIG. 1, the architecture of the Android operating system includes four layers, which are respectively an application layer, an application framework layer, a system runtime library layer, and a kernel layer (which may be specifically a Linux kernel layer).

The application layer includes various applications (including system applications and third-party applications) in the Android operating system.

The application framework layer is a framework of applications, and developers may develop some applications based on the application framework layer in a case of following the development principles of the framework of applications.

The system runtime library layer includes a library (also referred to as a system library) and an Android operating system runtime environment. The library mainly provides various resources required by the Android operating system. The Android operating system runtime environment is used for providing a software environment for the Android operating system.

The kernel layer is an operating system layer of the Android operating system and belongs to a software-level bottom layer of the Android operating system. The kernel layer provides, based on a Linux kernel, core system services and hardware-related drivers for the Android operating system.

The Android operating system is used as an example. In the embodiments of the present disclosure, the developers may develop, based on the system architecture of the Android operating system shown in FIG. 1, a software program implementing the data processing method according to the embodiments of the present disclosure, so that the data processing method can be performed based on the Android operating system shown in FIG. 1. That is, a processor or an electronic device may implement the data processing method according to the embodiments of the present disclosure by running the software program in the Android operating system.

Figure 2:
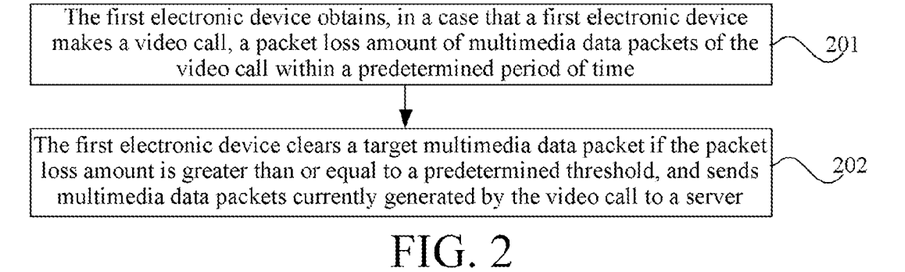
FIG. 2 is a schematic flowchart of a data processing method according to an embodiment of the present disclosure.

The data processing method according to the embodiments of the present disclosure is described below with reference to a flowchart of the data processing method shown in FIG. 2. FIG. 2 is a schematic flowchart of a data processing method according to an embodiment of the present disclosure. The method is applicable to a first electronic device, and includes step 201 and step 202.

Step 201: The first electronic device obtains, in a case that a first electronic device makes a video call, a packet loss amount of multimedia data packets of the video call within a predetermined period of time.

In this embodiment of the present disclosure, the first electronic device may make a video call with a second electronic device through different applications. For example, the foregoing first electronic device may make a video call with the second electronic device through a "call" APP, or may make a video call with the second electronic device through a "chat" APP, which may be specifically set according to actual needs, and is not limited in this embodiment of the present disclosure.

Exemplarily, the predetermined period of time (for example, 1 second) may be a period of time preset by a user, a system default period of time, or a period of time of a statistical duration of continuous packet loss, which is not limited in the embodiments of the present disclosure.

Exemplarily, the multimedia data packet may include at least one of the following: an audio data packet and a video data packet.

Exemplarily, the packet loss amount may be multimedia data packets of the video call discarded by the first electronic device in the packet data convergence protocol (PDCP) layer within a predetermined period of time.

In this embodiment of the present disclosure, when the packet loss amount is excessive, the second electronic device may have continuous screen blurring. To avoid this problem, the first electronic device may count the packet loss amount to determine whether the packet loss amount is excessive.

Exemplarily, step 201 may include the following step 201a and step 201b.

Step 201a: Within the predetermined period of time, if a timer corresponding to any multimedia data packet generated by the video call times out, the first electronic device discards the any multimedia data packet, and controls a counter to increase by 1.

Step 201b: The first electronic device reads, after the predetermined period of time, a value of the counter.

Exemplarily, the counter is configured to count the packet loss amount of the multimedia data packets of the video call within the predetermined period of time.

Exemplarily, a multimedia data packet corresponds to a timer.

Exemplarily, the timer may be configured by the server for the first electronic device. Exemplarily, the server may send an RRC command carrying configuration information to the first electronic device. The configuration information is used for configuring the timer for the first electronic device.

Exemplarily, the counter may be an up counter, or may be an up-down counter, which is not limited in this embodiment of the present disclosure. The up-down counter is a counter that can count up or down.

Step 202: The first electronic device clears a target multimedia data packet if the packet loss amount is greater than or equal to a predetermined threshold, and sends multimedia data packets currently generated by the video call to a server.

In this embodiment of the present disclosure, the target multimedia data packet is: all multimedia data packets corresponding to the video call cached in the first electronic device.

In this embodiment of the present disclosure, the first electronic device obtains, in a case that a first electronic device makes a video call, packet loss parameters of the video call, and the packet loss parameters include: a duration of continuous packet loss and a packet loss amount of multimedia data packets of the video call within the duration of continuous packet loss (that is, within the period of time of the statistical duration of continuous packet loss).

Exemplarily, the predetermined period of time is the duration of continuous packet loss, and the duration of continuous packet loss is greater than or equal to a preset duration.

In this embodiment of the present disclosure, if the first electronic device detects the packet loss of the video call, statistics may be performed on the duration of continuous packet loss of the video call. For example, the electronic device detects that the video call in the electronic device loses packets every 0.5 seconds, and a statistical cumulative duration of continuous packet loss is 5 seconds.

In this embodiment of the present disclosure, in a case that the duration of continuous packet loss is greater than or equal to a predetermined duration, and the packet loss amount of the multimedia data packets of the video call within the duration of continuous packet loss is greater than or equal to the predetermined threshold, the first electronic device clears the target multimedia data packet, and sends the multimedia data packets currently generated by the video call to the server. That is, if the packet loss amount of the multimedia data packets of the video call within the predetermined period of time is greater than or equal to the predetermined threshold, the first electronic device clears the target multimedia data packet, and sends the multimedia data packets currently generated by the video call to the server.

Exemplarily, the predetermined threshold and the predetermined duration may be thresholds preset by a user, or may be system default thresholds, which are not limited in this embodiment of the present disclosure. For example, the predetermined threshold may be that the first electronic device discards 50 multimedia data packets within 1 second.

For example, a mobile phone A is used as the first electronic device and a mobile phone B is used as the second electronic device. When a user makes a video call with other users through a "chat" APP in the mobile phone A, the mobile phone A sends a large quantity of video data packets to a server, and then the server forwards the video data packets to the mobile phone B. In the process that the mobile phone A sends a large quantity of video data packets to the server, the mobile phone A can monitor the packet loss of the video data packets in real time. If the mobile phone A detects that the mobile phone A continuously loses packets within 1 second, and the packet loss amount within 1 second is 55, which is greater than 50, due to the excessive packet loss amount, the mobile phone B cannot parse the video data packets received subsequently, and the screen blurring has been caused. In this case, the mobile phone A can clear the cached video data packets of the video call. After the cached video data packets of the video call are cleared, the mobile phone A can send a new video data packet of the video call to the server. When receiving the new video data packet of the video call, the mobile phone B can refresh and display a new screen.

It should be noted that, after the mobile phone A discards a part of the video data, the mobile phone B subsequently receives only P-frames. Therefore, the mobile phone B cannot parse the P-frames. However, the new video data packet of the video call includes I-frames. Therefore, when receiving the new video data packet of the video call, the mobile phone B can parse the new video data packet, and then refresh and display a new screen.

In an example, the target multimedia data packet may be a multimedia data packet cached by the first electronic device in the PDCP layer.

According to the data processing method provided in the embodiments of the present disclosure, in a case that a first electronic device makes a video call, and when a packet loss amount of multimedia data packets of the video call is excessive within a predetermined period of time, to avoid continuous screen blurring of a second electronic device making the video call with the first electronic device, the first electronic device can clear all multimedia data packets corresponding to the video call cached in the first electronic device, so that data in the first electronic device does not undergo excessive delay and queuing. In this way, the first electronic device can subsequently send multimedia data packets currently generated by the video call to a server, and the server can also forward the multimedia data packets currently generated by the video call to the second electronic device. Therefore, the second electronic device refreshes and displays a new screen after receiving a new multimedia data packet, thereby avoiding the problem of continuous screen blurring of the second electronic device.

In this embodiment of the present disclosure, to prevent the first electronic device from continuously sending multimedia data packets that cannot be parsed by the second electronic device to the server during the process of clearing the target multimedia data packet by the first electronic device, the first electronic device may stop sending multimedia data packets first.

Exemplarily, before step 202 in which the first electronic device clears the target multimedia data packet, the method may further include the following step 203.

Step 203: If the packet loss amount is greater than or equal to the predetermined threshold, the first electronic device stops sending the multimedia data packets of the video call to the server.

For example, a mobile phone A is used as the first electronic device and a mobile phone B is used as the second electronic device. When a user makes a video call with other users through the mobile phone A, the mobile phone A sends a large quantity of video data packets to a server, and then the server forwards the video data packets to the mobile phone B. If the mobile phone A detects that the mobile phone A continuously loses packets within 1 second, and the packet loss amount within 1 second is 55, which is greater than 50, the mobile phone A may stop (pause) sending the video data packets of the video call to the server, while the screen of the mobile phone B stays on the last screen. When receiving a new video data packet of the video call, the mobile phone B can refresh and display a new screen.

In this way, when detecting that the packet loss amount is greater than or equal to the predetermined threshold, the first electronic device may first stop sending the multimedia data packets of the video call to the server, thereby preventing the second electronic device from continuously receiving the multimedia data packets of the video call that cannot be parsed, and further reducing the time of screen blurring of the second electronic device.

Further, the first electronic device may notify an application layer of the electronic device to stop sending the multimedia data packets of the video call, and then stop sending the multimedia data packets of the video call to the server.

Exemplarily, step 203 may specifically further include the following step 203a and step 203b.

Step 203a: If the packet loss amount is greater than or equal to the predetermined threshold, the first electronic device sends a stop command to an application layer of the first electronic device.

Exemplarily, the stop command is used for instructing the application layer of the first electronic device to stop sending the multimedia data packets of the video call.

Exemplarily, the application layer is configured to generate data packets and transmit the data packets to a lower layer of the application layer.

Step 203b: According to the stop command, the application layer of the first electronic device stops sending the multimedia data packets of the video call.

For example, a mobile phone A is used as the first electronic device and a mobile phone B is used as the second electronic device. When a user makes a video call with other users through the mobile phone A, if the mobile phone A detects that the mobile phone A continuously loses packets within 1 second, and the packet loss amount within 1 second is 55, which is greater than 50, the mobile phone A may send a stop command to the application layer of the mobile phone A. When receiving the stop command, the application layer of the mobile phone A pauses sending the video data packets of the video call.

In this way, when detecting that the packet loss amount is greater than or equal to the predetermined threshold, the first electronic device may directly and accurately notify the application layer of the first electronic device to stop data transmission.

In this embodiment of the present disclosure, the PDCP layer is the most important layer of data transmission, and the data packets are discarded in the PDCP layer. To reduce the workload of the first electronic device, the first electronic device can clear the multimedia data packets of the video call only in the PDCP layer, which can also avoid the continuous screen blurring of the second electronic device.

Exemplarily, step 202 in which if the packet loss amount is greater than or equal to the predetermined threshold, the first electronic device clears the target multimedia data packet may specifically include the following step 202a1 and step 202a2.

Step 202a1: If the target multimedia data packet is all multimedia data packets corresponding to the video call cached in the PDCP layer of the first electronic device, and if the packet loss amount is greater than or equal to the predetermined threshold, the first electronic device sends a clear command to the PDCP layer of the first electronic device.

Exemplarily, the clear command is used for instructing the first electronic device to clear the multimedia data packets of the video call cached in the PDCP layer.

Step 202a2: According to the clear command, the first electronic device clears all the multimedia data packets corresponding to the video call cached in the PDCP layer.

In this way, the first electronic device can clear all the multimedia data packets corresponding to the video call in the PDCP layer, so that the data in the first electronic device does not undergo excessive delay and queuing, and the workload of the first electronic device is reduced.

Further, in this embodiment of the present disclosure, after the first electronic device clears all the multimedia data packets corresponding to the video call in the PDCP layer, the first electronic device may be triggered to resend the multimedia data packets of the video call.

Exemplarily, step 202 of sending the multimedia data packets currently generated by the video call to the server may specifically include the following step 202b1 and step 202b2.

Step 202b1: The first electronic device sends a resend command to an upper application layer of the PDCP layer.

Exemplarily, the resend command is used for instructing the first electronic device to send the multimedia data packets currently generated by the video call to the server.

Exemplarily, if the multimedia data packets are video data packets, the resend command is further used for instructing the first electronic device to regenerate a video data packet including an I-frame for sending.

Step 202b2: According to the resend command, the first electronic device sends the multimedia data packets currently generated by the video call to the server.

For example, a mobile phone A is used as the first electronic device and a mobile phone B is used as the second electronic device. When a user makes a video call with other users through the mobile phone A, if the mobile phone A detects that the PDCP layer of the mobile phone A continuously loses packets within 1 second, and the packet loss amount within 1 second is 55, which is greater than 50, the mobile phone A may send a clear command to the PDCP layer of the mobile phone A. When receiving the clear command, the PDCP layer of the mobile phone A clears the video data packets of the video call cached in the PDCP layer of the mobile phone A. Then, after the video data packets of the video call cached in the PDCP layer of the mobile phone A are cleared, the mobile phone A may send a resend command to the upper application layer of the PDCP layer. Next, when receiving the resend command, the application layer of the mobile phone A may send a new video data packet including an I-frame currently generated to the server. Finally, when receiving the new video data packet including the I-frame of the video call, the mobile phone B can refresh and display a new screen.

In this way, the first electronic device can clear all the multimedia data packets corresponding to the video call in the PDCP layer, so that the data in the first electronic device does not undergo excessive delay and queuing. After the multimedia data packets of the video call in the PDCP layer are cleared, the first electronic device can send a new multimedia data packet currently generated to the server. Therefore, after receiving the new multimedia data packet, the second electronic device refreshes and displays a new screen, thereby avoiding the problem of continuous screen blurring of the second electronic device.

Figure 3:
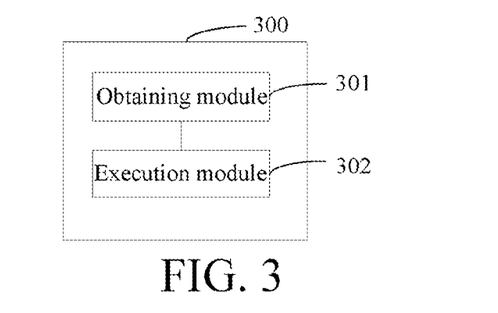
FIG. 3 is a first schematic structural diagram of an electronic device according to an embodiment of the present disclosure.

FIG. 3 is a schematic diagram of a possible structure of an electronic device for implementing the embodiments of the present disclosure. As shown in FIG. 3, the electronic device 300 includes: an obtaining module 301 and an execution module 302. The obtaining module 301 is configured to obtain, in a case that a first electronic device makes a video call, a packet loss amount of multimedia data packets of the video call within a predetermined period of time. The execution module 302 is configured to clear a target multimedia data packet if the packet loss amount obtained by the obtaining module 301 is greater than or equal to a predetermined threshold, and send multimedia data packets currently generated by the video call to a server. The target multimedia data packet is: all multimedia data packets corresponding to the video call cached in the first electronic device.

In some embodiments, the execution module 302 is further configured to, if the packet loss amount obtained by the obtaining module is greater than or equal to the predetermined threshold, stop sending the multimedia data packets of the video call to the server.

In some embodiments, the execution module 302 is further configured to, in a case that the target multimedia data packet is: all multimedia data packets corresponding to the video call cached in a PDCP layer of the first electronic device, and if the packet loss amount obtained by the obtaining module 301 is greater than or equal to the predetermined threshold, send a clear command to the PDCP layer of the first electronic device; and clear, according to the clear command, all the multimedia data packets corresponding to the video call cached in the PDCP layer.

In some embodiments, the execution module 302 is further configured to send a resend command to an upper application layer of the PDCP layer, and send, according to the resend command, the multimedia data packets currently generated by the video call to the server.

In some embodiments, the obtaining module 301 is further configured to, within the predetermined period of time, if a timer corresponding to any multimedia data packet generated by the video call times out, discard the any multimedia data packet, and control a counter to increase by 1; and read, after the predetermined period of time, a value of the counter. The counter is configured to count the packet loss amount of the multimedia data packets of the video call within the predetermined period of time.

According to the electronic device provided in this embodiment of the present disclosure, in a case that a first electronic device makes a video call, and when a packet loss amount of multimedia data packets of the video call is excessive within a predetermined period of time, to avoid continuous screen blurring of a second electronic device making the video call with the first electronic device, the first electronic device can clear all multimedia data packets corresponding to the video call cached in the first electronic device, so that data in the first electronic device does not undergo excessive delay and queuing. In this way, the first electronic device can subsequently send multimedia data packets currently generated by the video call to a server, and the server can also forward the multimedia data packets currently generated by the video call to the second electronic device. Therefore, the second electronic device refreshes and displays a new screen after receiving a new multimedia data packet, thereby avoiding the problem of continuous screen blurring of the second electronic device.

The electronic device provided in this embodiments of the present disclosure can implement various processes implemented by the electronic device in the foregoing method embodiments. To avoid repetition, details are not described herein again.

Figure 4:
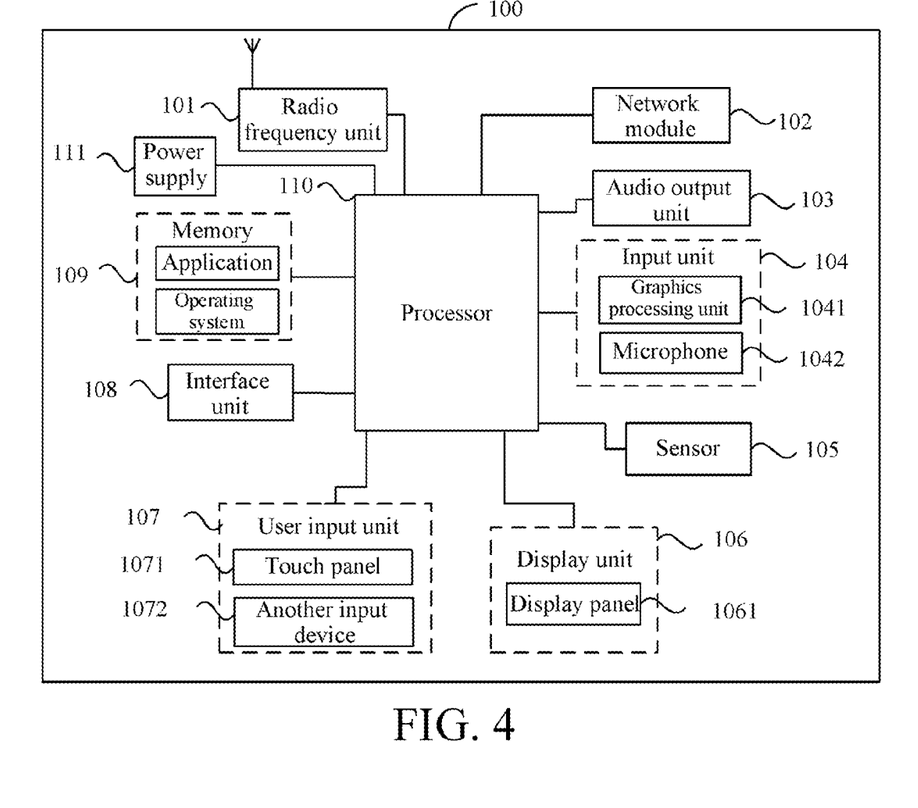
FIG. 4 is a second schematic structural diagram of an electronic device according to an embodiment of the present disclosure.

FIG. 4 is a schematic structural diagram of hardware of an electronic device for implementing various embodiments of the present disclosure. The electronic device 100 includes, but is not limited to, components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the electronic device 100 shown in FIG. 4 does not constitute a limitation to the electronic device. The electronic device 100 may include more or fewer components than those shown in the figure, or some components may be combined, or a different component deployment may be used. In this embodiment of the present disclosure, the electronic device 100 includes, but is not limited to, a mobile phone, a tablet computer, a notebook computer, a palmtop computer, an in-vehicle terminal device, a wearable device, a pedometer, and the like.

The processor 110 is configured to obtain, in a case that a first electronic device makes a video call, a packet loss amount of multimedia data packets of the video call within a predetermined period of time; and is further configured to clear a target multimedia data packet if the packet loss amount is greater than or equal to a predetermined threshold, and send multimedia data packets currently generated by the video call to a server. The target multimedia data packet is: all multimedia data packets corresponding to the video call cached in the first electronic device.

According to the electronic device provided in this embodiment of the present disclosure, in a case that a first electronic device makes a video call, and when a packet loss amount of multimedia data packets of the video call is excessive within a predetermined period of time, to avoid continuous screen blurring of a second electronic device making the video call with the first electronic device, the first electronic device can clear all multimedia data packets corresponding to the video call cached in the first electronic device, so that data in the first electronic device does not undergo excessive delay and queuing. In this way, the first electronic device can subsequently send multimedia data packets currently generated by the video call to a server, and the server can also forward the multimedia data packets currently generated by the video call to the second electronic device. Therefore, the second electronic device refreshes and displays a new screen after receiving a new multimedia data packet, thereby avoiding the problem of continuous screen blurring of the second electronic device.

It should be understood that, in this embodiment of the present disclosure, the radio frequency unit 101 may be configured to receive and send signals during an information receiving and sending process or a call process. Specifically, the radio frequency unit is configured to receive downlink data from a base station, and then send the downlink data to the processor 110 for processing; and in addition, send uplink data to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with a network device or another device through a wireless communication system.

The electronic device 100 provides wireless broadband Internet access for a user by using the network module 102. For example, the electronic device helps the user to receive and send an email, browse a web page, and access stream media, and the like.

The audio output unit 103 may convert audio data received by the radio frequency unit 101 or the network module 102, or stored in the memory 109 into an audio signal and output the audio signal as a sound. In addition, the audio output unit 103 may further provide an audio output (for example, a call signal receiving sound or a message receiving sound) related to a specific function executed by the electronic device 100. The audio output unit 103 includes a speaker, a buzzer, a receiver, and the like.

The input unit 104 is configured to receive an audio signal or a video signal. The input unit 104 may include a graphics processing unit (GPU) 1041 and a microphone 1042. The graphics processing unit 1041 is configured to process image data of a static image or a video obtained by an image capture apparatus (for example, a camera) in a video capture mode or an image capture mode. An image frame that has been processed may be displayed on the display unit 106. The image frame that has been processed by the graphics processing unit 1041 may be stored in the memory 109 (or another storage medium) or sent by using the radio frequency unit 101 or the network module 102. The microphone 1042 may receive a sound, and can process the sound into audio data. The processed audio data may be converted, in a phone talk mode, into a format that may be sent to a mobile communication base station through the radio frequency unit 101 for output.

The electronic device 100 further includes at least one sensor 105, such as an optical sensor, a motion sensor, and other sensors. Specifically, the optical sensor includes an ambient light sensor and a proximity sensor. The ambient light sensor may adjust luminance of a display panel 1061 according to brightness of ambient light. The proximity sensor may switch off the display panel 1061 and/or backlight when the electronic device 100 is moved to the ear. As one type of motion sensor, an accelerometer sensor can detect magnitudes of accelerations in various directions (generally, on three axes), may detect a magnitude and a direction of the gravity when static, and may be applied to recognizing the attitude of the electronic device (for example, switchover between horizontal and vertical screens, a related game, and magnetometer attitude calibration), a function related to vibration recognition (such as a pedometer and a knock), and the like. The sensor 105 may further include a fingerprint sensor, a pressure sensor, an iris sensor, a molecular sensor, a gyroscope, a barometer, a hygrometer, a thermometer, an infrared sensor, and the like, which is not described herein in detail.

The display unit 106 is configured to display information input by the user or information provided for the user. The display unit 106 may include a display panel 1061. The display panel 1061 may be configured in the form of a liquid crystal display (LCD), an organic light-emitting diode (OLED), or the like.

The user input unit 107 may be configured to receive input digit or character information, and generate a key signal input related to the user setting and function control of the electronic device 100. Specifically, the user input unit 107 includes a touch panel 1071 and another input device 1072. The touch panel 1071, also referred to as a touchscreen, may collect a touch operation of a user on or near the touch panel (for example, an operation of a user on the touch panel 1071 or near the touch panel 1071 by using any suitable object or accessory such as a finger or a stylus). The touch panel 1071 may include a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then sends the contact coordinate to the processor 110, and receives and executes an instruction sent by the processor 110. In addition, the touch panel 1071 may be implemented by using various types, such as a resistive type, a capacitive type, an infrared type, and a surface acoustic wave type. In addition to the touch panel 1071, the user input unit 107 may further include the another input device 1072. Specifically, the another input device 1072 may include, but not limited to, a physical keyboard, a functional key (such as a volume control key or a switch key), a track ball, a mouse, and a joystick, which are not described herein in detail.

Further, the touch panel 1071 may cover the display panel 1061. After detecting a touch operation on or near the touch panel 1071, the touch panel 1071 transmits the touch operation to the processor 110, to determine a type of a touch event. Then, the processor 110 provides a corresponding visual output on the display panel 1061 according to the type of the touch event. In FIG. 4, the touch panel 1071 and the display panel 1061 implement, as two independent parts, input and output functions of the electronic device 100. However, in some embodiments, the touch panel 1071 and the display panel 1061 may be integrated to implement the input and output functions of the electronic device 100, which is not specifically limited herein.

The interface unit 108 is an interface for connecting an external apparatus to the electronic device 100. For example, the external apparatus may include a wired or wireless headset port, an external power supply (or battery charger) port, a wired or wireless data port, a memory card port, a port for connecting an apparatus with a recognition module, an audio input/output (I/O) port, a video I/O port, a headphone port, and the like. The interface unit 108 may be configured to receive an input (such as data information or electric power) from an external apparatus and transmit the received input to one or more elements in the electronic device 100 or may be configured to transmit data between the electronic device 100 and the external apparatus.

The memory 109 may be configured to store a software program and various data. The memory 109 may mainly include a program storage area and a data storage area. The program storage area may store an operating system, an application required by at least one function (for example, a sound playback function and an image display function), and the like. The data storage area may store data (for example, audio data and a phone book) created according to use of the mobile phone. In addition, the memory 109 may include a high speed random access memory, and may further include a non-volatile memory, such as at least one magnetic disk storage device, a flash memory or another volatile solid-state storage device.

The processor 110 is a control center of the electronic device 100, and connects to various parts of the electronic device 100 by using various interfaces and lines. By running or executing the software program and/or the module stored in the memory 109, and invoking data stored in the memory 109, the processor performs various functions and data processing of the electronic device 100, thereby performing overall monitoring on the electronic device 100. The processor 110 may include one or more processing units. The processor 110 may integrate an application processor and a modem processor. The application processor mainly processes an operating system, a user interface, an application, and the like. The modem processor mainly processes wireless communication. It may be understood that the foregoing modem processor may not be integrated into the processor 110.

The electronic device 100 may further include the power supply 111 (such as a battery) for supplying power to the components. The power supply 111 may be logically connected to the processor 110 by using a power management system, thereby implementing functions, such as charging, discharging, and power consumption management, by using the power management system.

In addition, the electronic device 100 includes some functional module that are not shown, which are not described herein in detail.

An embodiment of the present disclosure further provides an electronic device, including a processor, a memory, and a computer program stored in the memory and runnable on the processor 110, the computer program, when executed by the processor, implementing the processes of the embodiments of the data processing method, and can achieve the same technical effects. To avoid repetition, details are not described herein again.

An embodiment of the present disclosure further provides a computer-readable storage medium, storing a computer program, the computer program, when executed by a processor, implementing the processes of the embodiments of the data processing method, and can achieve the same technical effects. To avoid repetition, details are not described herein again. The computer-readable storage medium is, for example, a read-only memory (ROM), a random access memory (RAM), a magnetic disk, an optical disc, or the like.

It should be noted that, terms "include", "comprise", and any variants thereof in this specification are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses.

Through the descriptions of the foregoing implementations, a person skilled in the art may clearly understand that the methods according to the foregoing embodiments may be implemented by means of software and a necessary general hardware platform, and certainly, may alternatively be implemented by hardware, but in many cases, the former manner is a better implementation. Based on such an understanding, the technical solutions of the embodiments of the present disclosure essentially or the part contributing to the existing technology may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the methods described in the embodiments of the present disclosure.

The embodiments of the present disclosure are described above with reference to the accompanying drawings. However, the embodiments of the present disclosure are not limited to the foregoing specific implementations. The foregoing specific implementations are illustrative instead of limitative. Enlightened by the embodiments of the present disclosure, a person of ordinary skill in the art can make many forms without departing from the idea of the embodiments of the present disclosure and the scope of protection of the claims. All of the forms fall within the protection of the embodiments of the present disclosure.

What is claimed is:

1. A data processing method, performed by a first electronic device, comprising:
    during a video call, obtaining a packet loss amount of multimedia data packets of the video call within a predetermined period of time; and
    when the packet loss amount is greater than or equal to a predetermined threshold, clearing a target multimedia data packet and sending multimedia data packets currently generated by the video call to a server as a replacement to the target multimedia data packet,
    wherein the target multimedia data packet comprises all multimedia data packets corresponding to the video call cached in the first electronic device.

2. The data processing method according to claim 1, wherein before the clearing a target multimedia data packet, the method further comprises:
    when the packet loss amount is greater than or equal to the predetermined threshold, stopping sending the multimedia data packets of the video call to the server.

3. The data processing method according to claim 1, wherein the target multimedia data packet is: all multimedia data packets corresponding to the video call cached in a Packet Data Convergence Protocol (PDCP) layer of the first electronic device; and
    when the packet loss amount is greater than or equal to a predetermined threshold, the clearing a target multimedia data packet comprises:
    when the packet loss amount is greater than or equal to the predetermined threshold, sending a clear command to the PDCP layer of the first electronic device; and
    clearing, according to the clear command, all the multimedia data packets corresponding to the video call cached in the PDCP layer.

4. The data processing method according to claim 2, wherein the target multimedia data packet is: all multimedia data packets corresponding to the video call cached in a Packet Data Convergence Protocol (PDCP) layer of the first electronic device; and when the packet loss amount is greater than or equal to a predetermined threshold, the clearing a target multimedia data packet comprises:

when the packet loss amount is greater than or equal to the predetermined threshold, sending a clear command to the PDCP layer of the first electronic device; and clearing, according to the clear command, all the multimedia data packets corresponding to the video call cached in the PDCP layer.

5. The method according to claim 3, wherein the sending multimedia data packets currently generated by the video call to a server comprises:

sending a resend command to an upper application layer of the PDCP layer; and sending, according to the resend command, the multimedia data packets currently generated by the video call to the server.

6. The method according to claim 1, wherein the obtaining a packet loss amount of multimedia data packets of the video call within a predetermined period of time comprises:

within the predetermined period of time, when a timer corresponding to a multimedia data packet generated by the video call times out, discarding the multimedia data packet, and controlling a counter to increase by 1; and reading, after the predetermined period of time, a value of the counter, wherein the counter is configured to count the packet loss amount of the multimedia data packets of the video call within the predetermined period of time.

7. An electronic device, wherein the electronic device is a first electronic device, comprising: a memory storing a computer program; and a processor coupled to the memory and configured to execute the computer program to perform a method for data processing, the method comprising:

during a video call, obtaining a packet loss amount of multimedia data packets of the video call within a predetermined period of time; and when the packet loss amount is greater than or equal to a predetermined threshold, clearing a target multimedia data packet and sending multimedia data packets currently generated by the video call to a server as a replacement to the target multimedia data packet, wherein the target multimedia data packet comprises all multimedia data packets corresponding to the video call cached in the first electronic device.

8. The electronic device according to claim 7, wherein before the clearing a target multimedia data packet, the method further comprises:

when the packet loss amount is greater than or equal to the predetermined threshold, stopping sending the multimedia data packets of the video call to the server.

9. The electronic device according to claim 7, wherein the target multimedia data packet is: all multimedia data packets corresponding to the video call cached in a Packet Data Convergence Protocol (PDCP) layer of the first electronic device; and when the packet loss amount is greater than or equal to a predetermined threshold, the clearing a target multimedia data packet comprises:

when the packet loss amount is greater than or equal to the predetermined threshold, sending a clear command to the PDCP layer of the first electronic device; and clearing, according to the clear command, all the multimedia data packets corresponding to the video call cached in the PDCP layer.

10. The electronic device according to claim 8, wherein the target multimedia data packet is: all multimedia data packets corresponding to the video call cached in a Packet Data Convergence Protocol (PDCP) layer of the first electronic device; and when the packet loss amount is greater than or equal to a predetermined threshold, the clearing a target multimedia data packet comprises:

when the packet loss amount is greater than or equal to the predetermined threshold, sending a clear command to the PDCP layer of the first electronic device; and clearing, according to the clear command, all the multimedia data packets corresponding to the video call cached in the PDCP layer.

11. The electronic device according to claim 9, wherein the sending multimedia data packets currently generated by the video call to a server comprises:

sending a resend command to an upper application layer of the PDCP layer; and sending, according to the resend command, the multimedia data packets currently generated by the video call to the server.

12. The electronic device according to claim 7, wherein the obtaining a packet loss amount of multimedia data packets of the video call within a predetermined period of time comprises:

within the predetermined period of time, when a timer corresponding to a multimedia data packet generated by the video call times out, discarding the multimedia data packet, and controlling a counter to increase by 1; and reading, after the predetermined period of time, a value of the counter, wherein the counter is configured to count the packet loss amount of the multimedia data packets of the video call within the predetermined period of time.

13. A non-transitory computer-readable storage medium, storing a computer program, when the computer program is executed by a processor of a first electronic device, performs a method for data processing, the method comprising:

during a video call, obtaining a packet loss amount of multimedia data packets of the video call within a predetermined period of time; and when the packet loss amount is greater than or equal to a predetermined threshold, clearing a target multimedia data packet and sending multimedia data packets currently generated by the video call to a server as a replacement to the target multimedia data packet, wherein the target multimedia data packet comprises all multimedia data packets corresponding to the video call cached in the first electronic device.

14. The non-transitory computer-readable storage medium according to claim 13, wherein before the clearing a target multimedia data packet, the method further comprises:

when the packet loss amount is greater than or equal to the predetermined threshold, stopping sending the multimedia data packets of the video call to the server.

15. The non-transitory computer-readable storage medium according to claim 13, wherein the target multimedia data packet is: all multimedia data packets corresponding to the video call cached in a Packet Data Convergence Protocol (PDCP) layer of the first electronic device; and when the packet loss amount is greater than or equal to a predetermined threshold, the clearing a target multimedia data packet comprises:
when the packet loss amount is greater than or equal to the predetermined threshold, sending a clear command to the PDCP layer of the first electronic device; and
clearing, according to the clear command, all the multimedia data packets corresponding to the video call cached in the PDCP layer.

16. The non-transitory computer-readable storage medium according to claim 14, wherein the target multimedia data packet is: all multimedia data packets corresponding to the video call cached in a Packet Data Convergence Protocol (PDCP) layer of the first electronic device; and
when the packet loss amount is greater than or equal to a predetermined threshold, the clearing a target multimedia data packet comprises:
when the packet loss amount is greater than or equal to the predetermined threshold, sending a clear command to the PDCP layer of the first electronic device; and
clearing, according to the clear command, all the multimedia data packets corresponding to the video call cached in the PDCP layer.

17. The non-transitory computer-readable storage medium according to claim 15, wherein the sending multimedia data packets currently generated by the video call to a server comprises:
sending a resend command to an upper application layer of the PDCP layer; and
sending, according to the resend command, the multimedia data packets currently generated by the video call to the server.

18. The non-transitory computer-readable storage medium according to claim 13, wherein the obtaining a packet loss amount of multimedia data packets of the video call within a predetermined period of time comprises:
within the predetermined period of time, when a timer corresponding to a multimedia data packet generated by the video call times out, discarding the multimedia data packet, and controlling a counter to increase by 1; and
reading, after the predetermined period of time, a value of the counter,
wherein the counter is configured to count the packet loss amount of the multimedia data packets of the video call within the predetermined period of time.

* * * * *